(12) United States Patent
Yannam et al.

(10) Patent No.: US 11,893,356 B1
(45) Date of Patent: Feb. 6, 2024

(54) CHATBOT CO-PILOT

(71) Applicant: Bank of America Corporation, Charlotte, NC (US)

(72) Inventors: Ramakrishna R. Yannam, The Colony, TX (US); Ion Gerald McCusker, Allen, TX (US); Prejish Thomas, Plano, TX (US); Ravisha Andar, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/986,212

(22) Filed: Nov. 14, 2022

(51) Int. Cl.
*G06F 40/35* (2020.01)
*G06F 3/0484* (2022.01)
*G06F 3/14* (2006.01)
*G06F 3/0481* (2022.01)

(52) U.S. Cl.
CPC ............ *G06F 40/35* (2020.01); *G06F 3/0481* (2013.01); *G06F 3/0484* (2013.01); *G06F 3/1454* (2013.01); *G06F 2203/04803* (2013.01)

(58) Field of Classification Search
CPC ...... G06F 40/35; G06F 3/0481; G06F 3/0484; G06F 3/1454
See application file for complete search history.

(56) References Cited

U.S. PATENT DOCUMENTS

| | | | | |
|---|---|---|---|---|
| 2010/0125174 A1* | 5/2010 | Bevan | ................... | G16H 40/67 600/300 |
| 2010/0226490 A1* | 9/2010 | Schultz | ............... | H04M 3/5233 379/265.09 |
| 2011/0216897 A1* | 9/2011 | Laredo | ................ | H04M 3/5191 379/265.13 |
| 2012/0041903 A1* | 2/2012 | Beilby | .................. | G06N 20/00 706/11 |
| 2012/0221502 A1* | 8/2012 | Jerram | .................... | G10L 25/27 706/46 |
| 2018/0052664 A1* | 2/2018 | Zhang | ...................... | G06N 5/04 |
| 2019/0034414 A1* | 1/2019 | Kim | ........................ | G06F 40/35 |

(Continued)

OTHER PUBLICATIONS

International Federation of Automatic Control (IFAC), Aremu et al., "Structuring Data for Intelligent Predictive Maintenance in Asset Management," Jun. 2018, IFAC PapersOnLine 51-11 (2018) 514-519, https://sciencedirect.com/science/article/pii/S2405896318314952.

(Continued)

*Primary Examiner* — William L Bashore
*Assistant Examiner* — Gregory A Distefano
(74) *Attorney, Agent, or Firm* — Weiss & Arons LLP

(57) ABSTRACT

Chatbots may be integrated into a customer service workflow and assist a user before, during and after a user-agent interaction. The chatbot may assist an agent during a user-agent interaction. The chatbot may provide customized responses for a target agent or user. Customized responses may be formulated based on conversation context, account information, sentiment and diagnostic tools. Chabot responses may be customized to meet habits and patterns of a target agent or user. The chatbot may crowdsource questions to other agents or users. The chatbot may employ search engines, entity and slot extraction and heat maps and clustering analysis to generate relevant responses for the agent or user.

18 Claims, 6 Drawing Sheets

(56) References Cited

U.S. PATENT DOCUMENTS

2019/0311036 A1* 10/2019 Shanmugam ........... G06F 40/56
2020/0314244 A1* 10/2020 Matula ........... G06Q 10/063112
2022/0156298 A1* 5/2022 Mahmoud ........... G06F 16/9535

OTHER PUBLICATIONS

Wikimedia Foundation, Inc., "Chatbot," accessed, Nov. 2, 2022, https://en.wikipedia.org/wiki/Chatbot.
Tech Target.com, Kate Brush, "What Is A Chatbot?", Nov. 18, 2021, https://www.techtarget.com/searchcustomerexperience/definition/chatbot?vgnextfmt=print.

* cited by examiner

CHATBOT CO-PILOT

FIELD OF TECHNOLOGY

This application describes apparatus and methods for utilizing artificial intelligence software tools to shorten the duration of an interaction between a human agent and a human user.

BACKGROUND

Automated chatbots allow users to receive customer service at any time. Chatbots may be capable of answering common questions and providing transactional support. The chatbot receives input from a human user (hereinafter, "user"). The inputs may be voice, text or selection of choices presented by the chatbot. The inputs correspond to the user expressing a purpose or reason why the user needs customer service or transaction support. Chatbots use a variety of techniques to correctly discern the meaning of the user's inputs and provide automated responses that efficiently service the user.

However, the chatbot may not be able to accurately discern the user's purpose or reason. Alternatively, in some instances, the chatbot may correctly determine that the user's service request requires intervention by a human agent. In either scenario, the chatbot may be configured to connect the user to a human agent (hereinafter, "agent").

Typically, after the user is connected to the agent, the agent exclusively attends to the user without further automated assistance from the chatbot. It is technically challenging to effectively integrate responses from the chatbot into responses formulated by the agent such that tandem involvement by both the agent and chatbot improves efficiency of the interaction such that the user achieves their objectives faster than without involvement of the chatbot.

However, as described herein, CHATBOT CO-PILOT provides apparatus and methods for efficiently integrating a chatbot system into an agent-user interaction.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
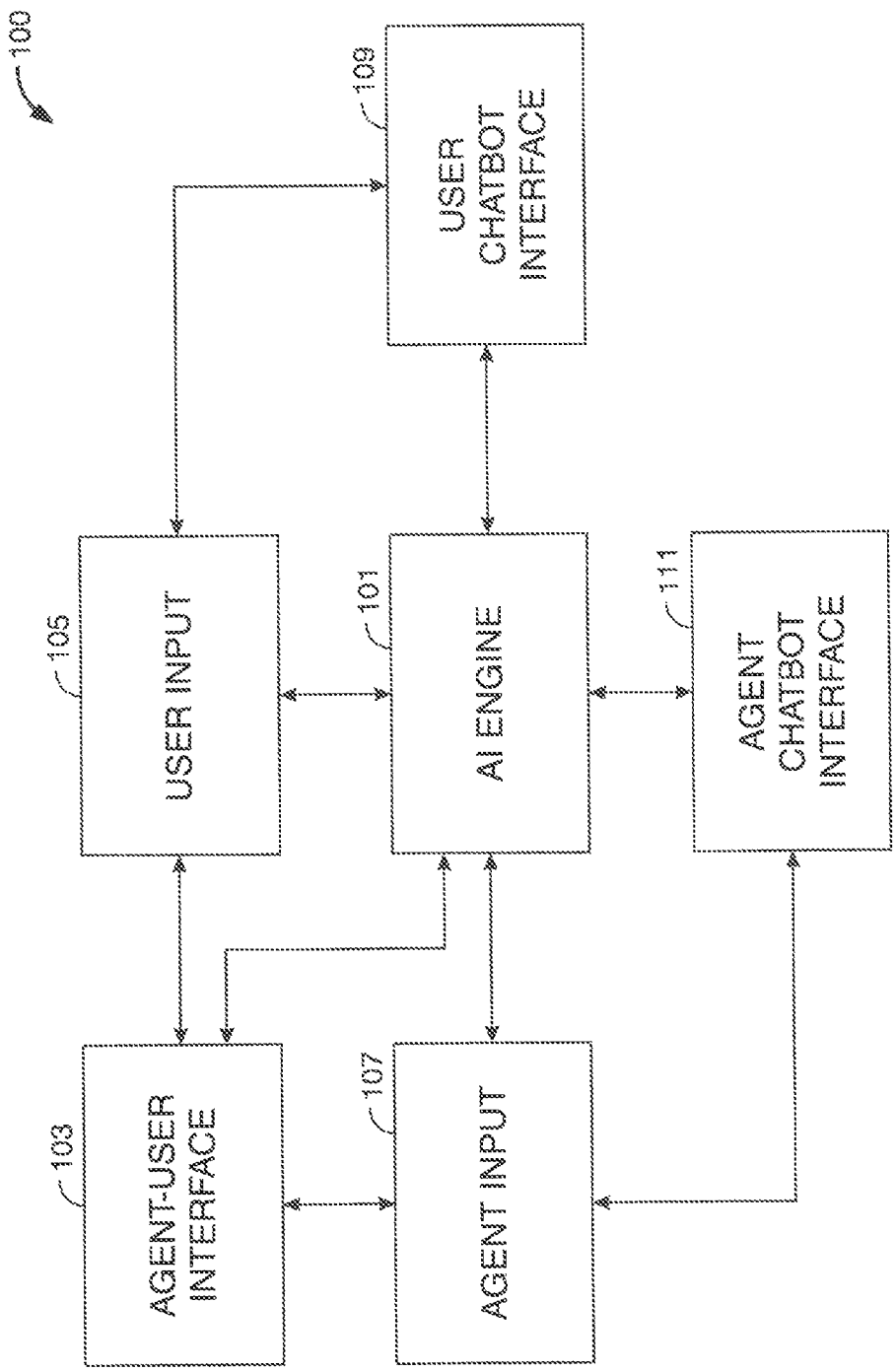
FIG. 1 shows an illustrative system in accordance with principles of the disclosure.

Methods are provided for leveraging artificial intelligence to integrate a chatbot into human-to-human interactions. Methods may include initiating an interaction with a user and a chatbot. Methods may include capturing inputs submitted to the chatbot by the user.

The chatbot may attempt to decipher a question or concern of the user. The chatbot may attempt to decipher why the user has initiated the chatbot interaction. In some scenarios, the chatbot may determine that the user should be handed-off to an agent. For example, the user may request a service (e.g., waiver of a fee) that requires review and approval by an agent.

Methods may include connecting the user to the agent. The chatbot may initiate a hand-off procedure to the agent. Methods may include, after connecting the user to the agent, continuing to provide inputs generated by the user to the chatbot. Even after transferring the user to the agent, the chatbot may continue to "listen" to inputs submitted by the user. The chatbot may continue to generate predictive recommendations and responses based on analysis of the inputs received from the user.

Methods may include providing, to the agent, predictive responses to the user inputs generated by the chatbot. The predictive responses may include responses to the user inputs that the agent may provide to the user. The predicative responses may include fully formulated responses. Fully formulated responses include machine generated responses that may be forwarded to the user by the agent. Fully formulated responses may be forwarded to the user without the agent making any changes or edits to the machine generated response.

An artificial intelligence ("AI") system for reducing time a first agent spends interacting with a user is provided. The AI system may include one or more computer servers. The server may be a network connected computer system. Computer servers, as disclosed herein, may include a processor circuit. The processor circuit may control overall operation of the server and its associated components. The processor circuit may include hardware, such as one or more integrated circuits that form a chipset. The hardware may include digital or analog logic circuitry configured to perform any suitable (e.g., logical) operation.

For example, a server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more speakers for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of the computer executable instructions of the server may be embodied in hardware or firmware components of the server.

The server may include cloud computing and virtualization implementations of software. Such implementations may be designed to run on a physical server supplied externally by a hosting provider, a client, or other virtualized platform.

Software application programs, which may be used by the server, may include computer executable instructions for invoking user functionality related to communication, such as email, short message service ("SMS"), and voice input and speech recognition applications. Software application programs may utilize one or more algorithms that formulate predictive machine responses, formulate database queries, process user inputs, process agent inputs, or any other suitable tasks.

Machine learning algorithms may identify patterns in traced data and make decisions about how to change a network based on the detected patterns. Machine learning algorithms improve over time because the algorithms are programmed to learn from previous decisions. Illustrative machine learning algorithms may include AdaBoost, Naive Bayes, Support Vector Machine and Random Forests. An illustrative machine learning algorithm may include a neural network such as Artificial Neural Networks and Convolutional Neural Networks.

Generally, a neural network implements machine learning by passing an input through a network of neurons—called layers—and providing an output. The more layers of neurons that are included in the neural network, the "deeper" the neural network. A neural network learns from outputs flagged as erroneous and adapts its neuron connections such that the next time the neural network receives a particular input it generates a more relevant output.

To effectively provide relevant outputs, a neural network must first be trained by analyzing training data sets. Neural networks learn from the training data sets and rearrange interconnection between layers of the network in response to processing the training data. The strength or weight of a connection between layers of the neural network can vary. A connection between two or more layers can be strong, weak or anywhere in between. A neural network may self-adapt by adjusting the strength of the connections among its layers to generate more accurate outputs.

A server may include a communication circuit. The communication circuit may include a network interface card or adapter. When used in a WAN networking environment, apparatus may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

A server may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

A server may utilize computer-executable instructions, such as program modules, executed by a processor. Generally, program modules include routines, programs, objects, components, data structures, etc. that perform particular tasks or implement abstract data types. A server may be operational with distributed computing environments where tasks are performed by remote processing devices that are linked through a communications network. In a distributed computing environment, program modules may be located in both local and remote computer storage media including memory storage devices. A server may rely on a network of remote servers hosted on the Internet to store, manage, and process data (e.g., "cloud computing" and/or "fog computing").

Servers disclosed herein may be produced by different manufacturers. For example, a user may connect to a server hosting an automated chatbot system via a first server, and the chatbot that processes the user's inputs may be run on a second server. An agent may utilize a third server to submit inputs while interacting with the user and/or the chatbot.

Servers may capture data in different formats. Servers may use different data structures to store captured data. Servers may utilize different communication protocols to transmit captured data or communicate with other systems. Despite such operational differences, servers may be configured to operate substantially seamlessly to interact with the user, agent and the chatbot across different servers, operating systems, hardware or networks.

The AI system may include an automated chatbot. The chatbot may include first machine executable instructions stored on a non-transitory memory of a computer system. The first machine executable instructions when executed by a processor on the computer system may implement functionality of the chatbot. The first machine executable instructions may include a software or computer program.

Illustrative chatbot functionality implemented by the first machine executable instructions may include receiving inputs from a user. The inputs may include voice inputs. The inputs may include text or touch inputs. The chatbot may provide an interface for a user to interact with the chatbot. The chatbot may utilize one or more machine learning algorithms to generate a first automated response based on the input received from the user.

The AI system may include second machine executable instructions. The second machine executable instructions may implement an agent interface. The agent interface may include software tools for a first agent to concurrently interact directly with the user and directly with the automated chatbot. The second machine executable instructions may be stored on the non-transitory memory of the computer system. The second machine executable instructions when executed by the processor on the computer system may generate a plurality of interface windows. Each interface window may provide the agent with software tools and information responsive to inputs received from the user.

A first interface window may present the first automated response generated by the chatbot based on input received from the user. The first interface window may allow the first agent to override the first automated response. For example, the first agent may change or tweak the first automated response generated by the chatbot in response to use input before the first automated response is pushed to the user. The first agent may override the automated response after the first automated response is presented to the user.

In some embodiments, the first agent interface may prevent the first human agent from overriding the first automated response. For example, a crowdsourced response received from at least one second agent may correspond to the first automated response. Because the crowdsourced response corresponds to the first automated response, the agent interface may not allow the first agent to override the first automated response.

The agent interface may generate a second interface window. The second interface window may allow the first agent to interact directly with the user. Using the second interface window the first agent may type "free form" inputs, such as responses to the user's inputs. The responses of the first agent may then be pushed to the user The agent interface may generate a third interface window. The third interface window may allow the first agent to interact directly with the chatbot. For example, the third interface window may allow the first agent to submit input to the automated chatbot. The first agent may submit input requesting the chatbot obtain information the first agent may need to service the user. For example, the first agent may ask the chatbot to obtain a record of fees charged to the user or a transaction history associated with the user.

The third interface window may also present second automated responses generated by the chatbot. The third interface window may allow the first agent to respond to the user by moving the second automated response generated by the chatbot into the second interface window. The second interface window may display an interaction (e.g., inputs and responses) between the agent to the user.

The agent interface may apply context-based machine learning to the first input (received from the user) and the first automated response (generated by the chatbot) to generate the second automated responses (presented to the agent). The second automated responses may be generated by applying predictive servicing intelligence algorithms to input received from the user and/or the agent.

The agent interface may generate a fourth interface window. The fourth interface window may be configured to submit inputs received from the user or the first agent to one or more second agents. The agent interface may crowdsource the submitted inputs among one or more second agents. The one or more second agents may be asked how they would respond to the presented inputs. The fourth interface window may present the crowdsourced responses to the first agent. The fourth interface window may allow the first agent to respond to the user by moving the crowdsourced response into the second window.

The fourth interface window may present, to the agent, input received from the user before the user began interacting with the first agent. The fourth interface window may also present input submitted by the first agent while the first agent was interacting with the user during a second time period. The automated chatbot may apply machine learning algorithms to generate an automated output that is based on both the user input received during the first time period and the agent input received during the second time period.

Based on the first input received from the user, the agent interface may locate at least one transaction associated with the user. The agent interface may integrate the at least one located transaction into an automated response generated by the chatbot. The agent interface may present the at least one transaction to the first agent in the third interface window.

The agent interface may present the first, second, third and fourth interface windows concurrently. Based on the second automated response generated in response to the agent inputs, the agent interface may determine a location for each of the first, second, third and fourth interface windows within a user interface of the agent interface.

For example, if the agent is actively utilizing the automated responses shown in the third interface window, the agent interface may position the second interface window directly above or below the second interface window (where the agent is directly interacting with the user). If the agent is actively utilizing the crowdsourced responses shown in the fourth interface window, the agent interface may position the fourth interface window directly above or below the second interface window (where the agent is directly interacting with the user).

The agent interface may selectively hide one or more of the interface windows. For example, the agent interface may not show the fourth interface window unless at least one crowdsourced response has been received at least one second agent. The location of each interface window may be determined based on relevance of the information presented in each window. The location of each window may be determined by an AI engine based on agent activity within each window. The level relevance may be determined by the AI engine. The AI engine may be included in the chatbot. The AI engine may be included in the agent interface.

The AI engine may be a computer server. The AI engine may include computer programs that process datasets to enable problem-solving by computer systems. The AI engine may perform problem-solving tasks that normally require human-like intelligence. Illustrative AI computational algorithms utilized by the AI engine may include AdaBoost, Naive Bayes, Support Vector Machine, Random Forests, Artificial Neural Networks and Convolutional Neural Networks.

The AI engine may perform machine learning AI and deep learning AI. Machine learning AI may identify patterns in data sets and make decisions based on the detected patterns. Machine learning AI is typically used to predict future behavior. Machine learning AI improves each time the AI system receives new data because new patterns may be discovered in the larger data set now available to the machine learning AI. Deep learning AI adapts when exposed to different patterns of data. Deep learning AI may uncover features or patterns in data that the deep learning AI was never specifically programmed to find.

An Artificial Intelligence ("AI") system for reducing remote interaction time of a first agent and a user is provided. The AI system may include an automated chatbot. The chatbot may receive first input from the user. The chatbot may autonomously generate first output responsive to the first input. The chatbot may receive second input from the first agent. The chatbot may autonomously generate second output responsive to the second input. The chatbot may include an AI engine that autonomously generates the output.

The AI system may include a user interface that provides the user access to user software tools. The user software tools may allow the user to interact with the chatbot. For example, the user software tools may allow the user to submit the first input to the chatbot and receive responses autonomously generated by the chatbot. The user software tools may allow the user to interact with the first agent. For example, the user software tools may allow the user to submit input to the first agent and receive outputs generated by the first agent.

The AI system may include an agent interface. The agent interface may include machine executable instructions that when executed by a processor on a computer system implement functionality of the agent interface. The agent interface may provide the first agent access to agent software tools. The agent software tools may allow the first agent to interact directly with the user.

For example, the first agent may type free form responses to inputs submitted by the user. The agent software tools may also allow the first agent to interact directly with the automated chatbot. For example, the first agent may submit requests for information that may assist the first agent formulate a response to input submitted by the user.

The agent interface may generate a first interface window. The first interface window may show the first agent a first interaction of the user and the automated chatbot. For example, the first interface window may show inputs submitted by the user and outputs generated by the chatbot in response to those inputs.

The agent interface may present a second interface window. The second interface window may show an interaction of the first agent with the user. The interaction between the first agent and the user may include inputs submitted by the user. The inputs submitted by the user may be concurrently processed by the chatbot and the first agent. The chatbot may autonomously generate outputs based on inputs submitted by the user and inputs submitted by the first agent.

The agent interface may present a third interface window. Within the third interface window, the first agent may interact directly with the user. The agent interface may present a fourth interface window. Inputs received from the user, first agent and/or chatbot may be circulated to the second agents. The agent interface may circulate those inputs to the one or more second agents. The crowdsourced responses to inputs circulated to the second agents may be presented to the first agent in the fourth interface window.

The agent interface may request crowdsourced responses from the second agents based on a real-time workflow associated with each of the second agents. For example, the agent interface may locate second agents that are otherwise idle and request that those second agents respond to inputs received from the user or first agent. The agent interface may locate second agents that have previously responded to inputs that share common characteristics with the inputs received from the user or first agent. An illustrative common characteristic may include successful integration of a crowdsourced response into a response provided to a user. The common characteristics may be determined by the AI engine using machine learning.

The chatbot may dynamically configure the agent interface to prevent the first agent from overriding an automated response generated by the chatbot. For example, the chatbot may detect that a crowdsourced response corresponds to the automated response generated by the chatbot. In such scenarios because the automated response corresponds to the crowdsourced response, the chatbot may not allow the first agent to alter the automated response before transmitting it to the user.

The chatbot may dynamically configure the agent interface to present a fifth interface window. The fifth interface window may be presented to the one or more second agents. The fifth interface window may mirror the interaction of the user and the automated chatbot. The fifth interface window may allow the one or more second agents to see what has transpired during an interaction between the user and the chatbot. The second agents may then formulate a crowdsourced response based on the interaction between the user and the chatbot.

The fifth interface window may also mirror interaction of the first agent with the user. The fifth interface window may allow the one or more second agents to see what has transpired during interaction between the user and the first agent. The second agents may then formulate a crowdsourced response based on the interaction between the user and the first agent.

The fifth interface window may mirror interaction of the first human agent and the automated chatbot. The fifth interface window may allow the one or more second agents to see what has transpired during an interaction between the first agent and the chatbot. The second agents may then formulate a crowdsourced response based on the interaction between the first agent and the chatbot.

The chatbot may interject autonomously generated responses into the user interface while the first agent is interacting directly with the user. For example, the chatbot may ask the user whether responses received from the first agent address concerns of the user. The chatbot may ask the user whether they would like alternatives to solutions proposed by the first agent. The chatbot may interject crowdsourced responses into the user interface while the first agent is interacting directly with the user.

The crowdsourced responses may provide more accurate responses to the user's input compared to the automated generated responses or responses formulated by the first agent. For example, the AI engine may determine whether two or more crowdsourced responses share a common characteristic. An illustrative common characteristic may be a threshold number of crowdsourced responses that all suggest the same or similar response. The common characteristics or a degree of sameness or similarity may be determined by the AI engine using machine learning.

The agent interface may improve utilization of machine generated responses by the first agent. The d agent interface may provide responses that are more relevant and more readily accepted by the first agent or user. The agent interface may provide the first agent with useful and autonomously generated responses that can easily be edited and forwarded to a user. Such effective human-computer interaction may shorten response times of the first agents and improve efficiency of the first agent. Other efficiency considerations provided by the agent interface include allowing the first agent to manage multiple interactions concurrently or supervise multiple automated channels concurrently.

An artificial intelligence ("AI") method for reducing time a first agent spends interacting with a user is provided. The AI method may include, using a client application running on a mobile device, initiating a first interaction between the user and an automated chatbot. The AI method may include connecting the client application to a first agent application.

The AI method may include using the first agent application, initiating a second interaction and a third interaction. The second interaction may be conducted in parallel with the first interaction. The second interaction may be between the first agent and the user. The AI method may include initiating a third interaction. The third interaction may crowdsource input captured from the first interaction and/or the second interaction among one or more second agent applications. The third interaction may be conducted in parallel with the first and/or second interactions.

The AI method may include initiating a fourth interaction between the first agent and the automated chatbot. The fourth interaction may be conducted in parallel with the first, second and/or third interactions. The AI method may include applying one or more machine learning algorithms to the first interaction, the second interaction and the third interaction. Applying the machine learning algorithms to these interactions may cause the chatbot to generate automated responses for the fourth interaction. The AI method may include presenting the first, second, third and/or fourth interactions within one or more interface windows generated by the first agent application.

The AI method may include receiving a threshold number of crowdsourced responses from the one or more second agent applications (e.g., the third interaction). The threshold number of crowdsourced responses may each share one or more characteristics. The shared characteristics may be detected by an AI engine running one or more machine learning algorithms. In response to receiving the threshold number of crowdsourced responses, the AI method may include interjecting at least one of the crowdsourced responses into the user interface.

The interjecting may include pushing the crowdsourced response to the user's mobile device. The interjecting may include presenting the crowdsourced response within the user interface while the first agent is interacting directly with the user (e.g., second interaction). The interjecting may include presenting the crowdsourced response within the first agent application while the first agent is interacting directly with the chatbot (e.g., fourth interaction).

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system 100. System 100 includes AI engine 101. AI engine 101 receives user input 105. User input 105 may also be provided to user chatbot interface 109. User input 105 may include voice, text or user selections. User inputs 105 may correspond to the user expressing a purpose or reason why the user needs customer service or other assistance. AI engine 105 may generate automated responses based on user input 105. The automated responses generated by AI engine 105 may be presented within user chatbot interface 109.

AI engine 101 also receives agent input 107. Agent input 107 may include responses formulated by an agent servicing user input 105. An agent may interact directly with a user via agent-user interface 103. Agent input 107 may include questions or requests submitted by an agent to AI engine 105. AI engine 101 may generate automated responses provided to user chatbot interface 109 based on agent input 107.

Automated responses generated by AI engine 105 may be presented to the agent within agent-chatbot interface 111. Based on agent input 107 and/or user input 105, AI engine 101 may generate automated responses presented to the agent within agent-chatbot interface 111. The AI engine may apply one or more machine learning algorithms to user input 105 and/or agent input 107 to generate an automated response.

Figure 2:
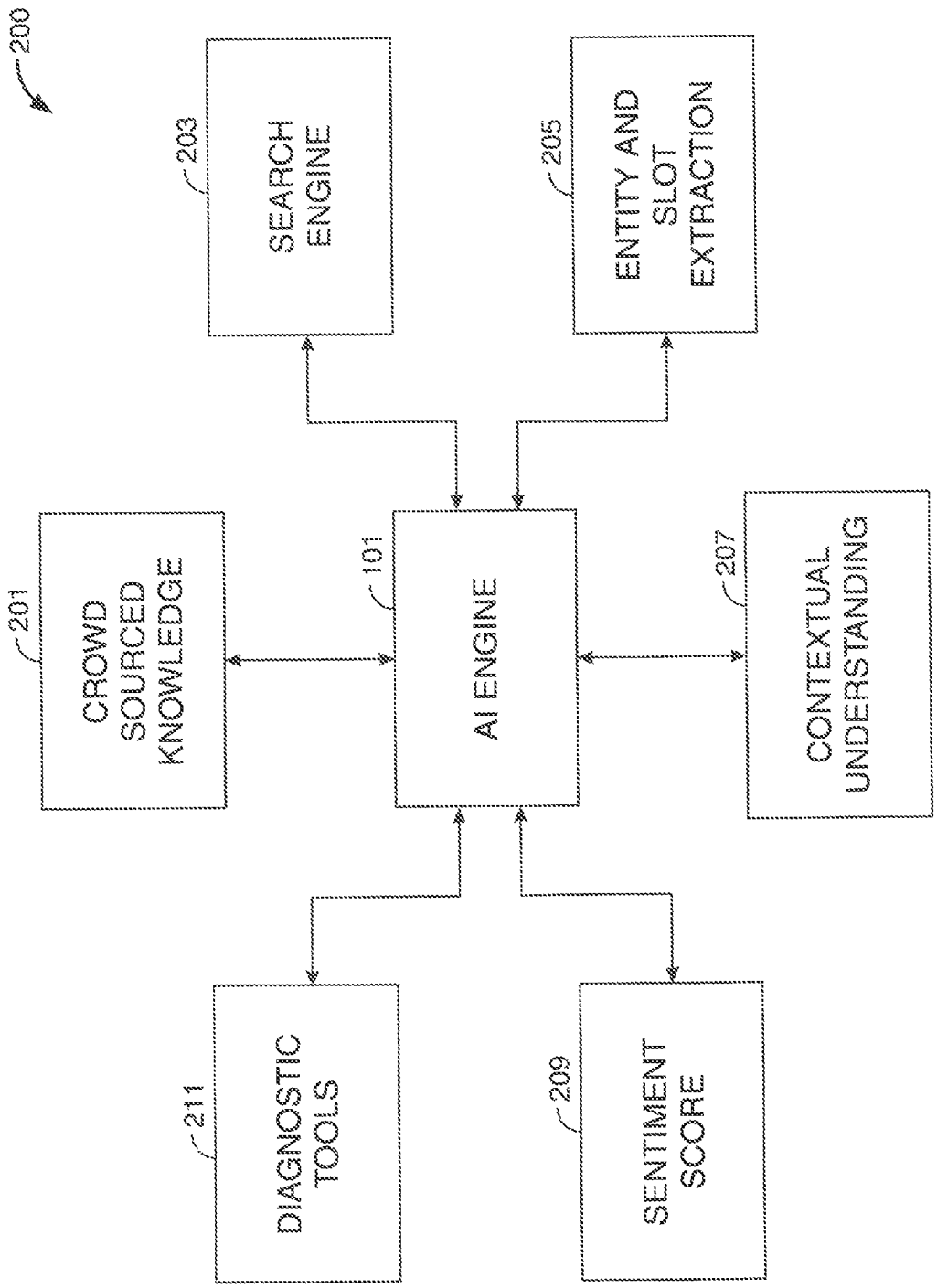
FIG. 2 shows an illustrative system in accordance with principles of the disclosure.

FIG. 2 shows system 200. System 200 shows an illustrative intelligence toolkit that may be utilized by AI engine 101 to generate automated responses. System 200 includes crowdsourced knowledge module 201. Crowdsourced knowledge module 201 may capture user input 105 and/or agent input 107 and circulate those inputs to other agents. Crowdsourced knowledge module 201 may request that those other agents formulate a response to user input 105 and/or agent input 107. AI engine 101 may present responses obtained by crowdsourced knowledge module 201 within user-chatbot interface 109. AI engine 101 may present responses obtained by crowdsourced knowledge module 201 within agent-chatbot interface 111.

System 200 includes search engine module 203. AI engine 101 may utilize search engine module 203 to search and refine terms captured from user input 105 and/or agent input 107. For example, AI engine 101 may utilize search engine module 203 to accurately identify merchants/transactions, spell check inputs, match short phrases, search results from other interfaces/websites or locate business templates based on inputs 105 and/or 107.

System 200 includes entity and slot extraction module 205. Entity and slot extraction module 205 may provide autonomously generated values for amounts, dates, accounts, topics requested in user input 105 and/or agent input 107. For example, AI engine 101 may attempt to autocomplete agent input 107. Entity and slot extraction module 205 may allow AI engine 101 to present the following choices within agent chatbot interface 111: "To check your [checking] [savings] [investment] balance follow the steps in this [checking tutorial] [savings tutorial] [investment tutorial] video." The text shown in brackets represents choices generated by entity and slot extraction module 205 that may be selected by the agent. The agent may select the desired options and the selected option will then be inserted into agent input 107 for presentation within agent-user interface 103.

System 200 includes contextual understanding module 207. Contextual understanding module 207 may allow for processing of user inputs 105 and/or agent inputs 107 based on historical user and/or agent inputs. For example, an illustrative user input 105 may include "What is my credit score." Contextual understanding module 207 may allow AI engine 101 to process the follow-on question "Why did it go up?" Contextual understanding module 207 may understand that "it" in the follow-on question refers to the previously referenced credit score.

System 200 includes sentiment score module 209. Sentiment score module 209 may process a sentiment of user input 105 and/or agent input 107. Sentiment score module 209 may detect shifts in sentiment from positive to negative and/or negative to positive. AI engine 101 may generate responses that mitigate the effects of such shifts and/or augment such shifts in sentiment. Sentiment score module 209 may detect at least 15 different sentiment signals. Sentiment score module 209 may determine whether a user should be transferred to an agent or whether to crowdsource user input 105.

System 200 includes diagnostic tool module 211. Diagnostic tool module 211 may classify user inputs 105 and agent inputs 107. For example, diagnostic tool module 211 may detect common characteristics within user inputs 105 and agent inputs 107. Diagnostic tool module 211 may detect common characteristics detected within crowdsourced responses 201. Diagnostic tool module 211 may generate a heat map to visually present the common characteristics. Diagnostic tool module 211 may generate a clustering analysis for products or services referenced in user inputs 105, agent inputs 107 and crowdsourced responses 201.

Figure 3:
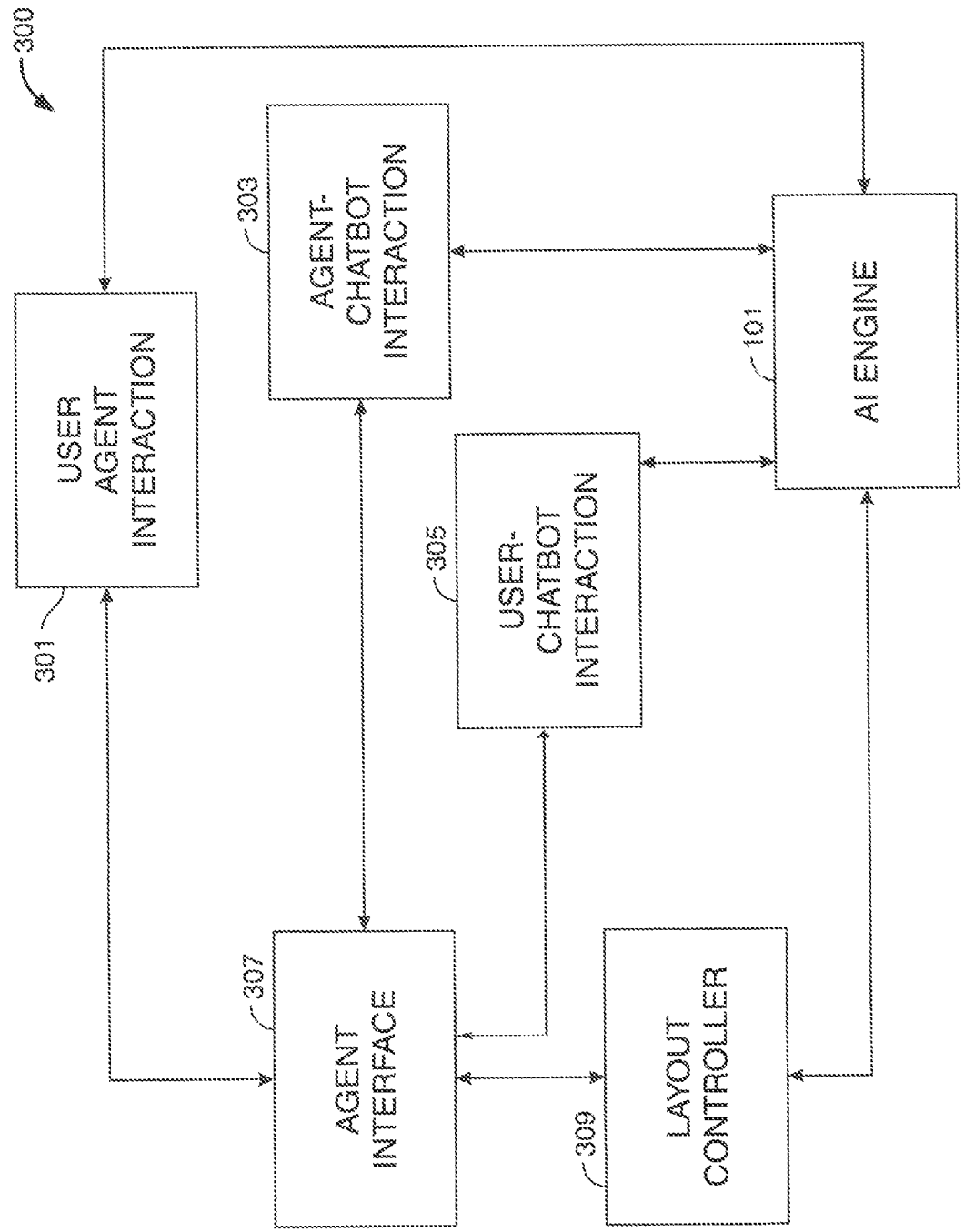
FIG. 3 shows an illustrative system in accordance with principles of the disclosure.

FIG. 3 shows illustrative system 300. System 300 shows that AI engine 101 (using functionality provided by components shown in FIGS. 1 and 2) may provide autonomous responses to user-agent interaction 301. System 300 shows that AI engine 101 (using functionality provided by components shown in FIGS. 1 and 2) may provide autonomous responses to agent-chatbot interaction 303. System 300 shows that AI engine 101 (using functionality provided by components shown in FIGS. 1 and 2) may provide autonomous responses to user-chatbot interaction 305.

AI engine 101 may provide autonomous responses concurrently to each of interactions 301, 303 and 305. AI engine 101 may compute an autonomous response for one of interactions 301, 303 and 305 based on activity in connection with the other two interactions.

FIG. 3 also shows that each of interactions 301, 303 and 305 may be presented within agent interface 307. For example, each of interactions 301, 303 and 305 may be presented within a separate interface window. Layout controller 309 may determine a position of each interface window within agent interface 307. Layout controller 309 may determine a position of each interface window based on the autonomous responses generated by AI engine 101 for a particular interface window. Layout controller 309 may hide one or more interface windows. Layout controller 309 may only present one or more of the interface windows after generating an autonomous response for interaction presented in the interface window.

Figure 4:
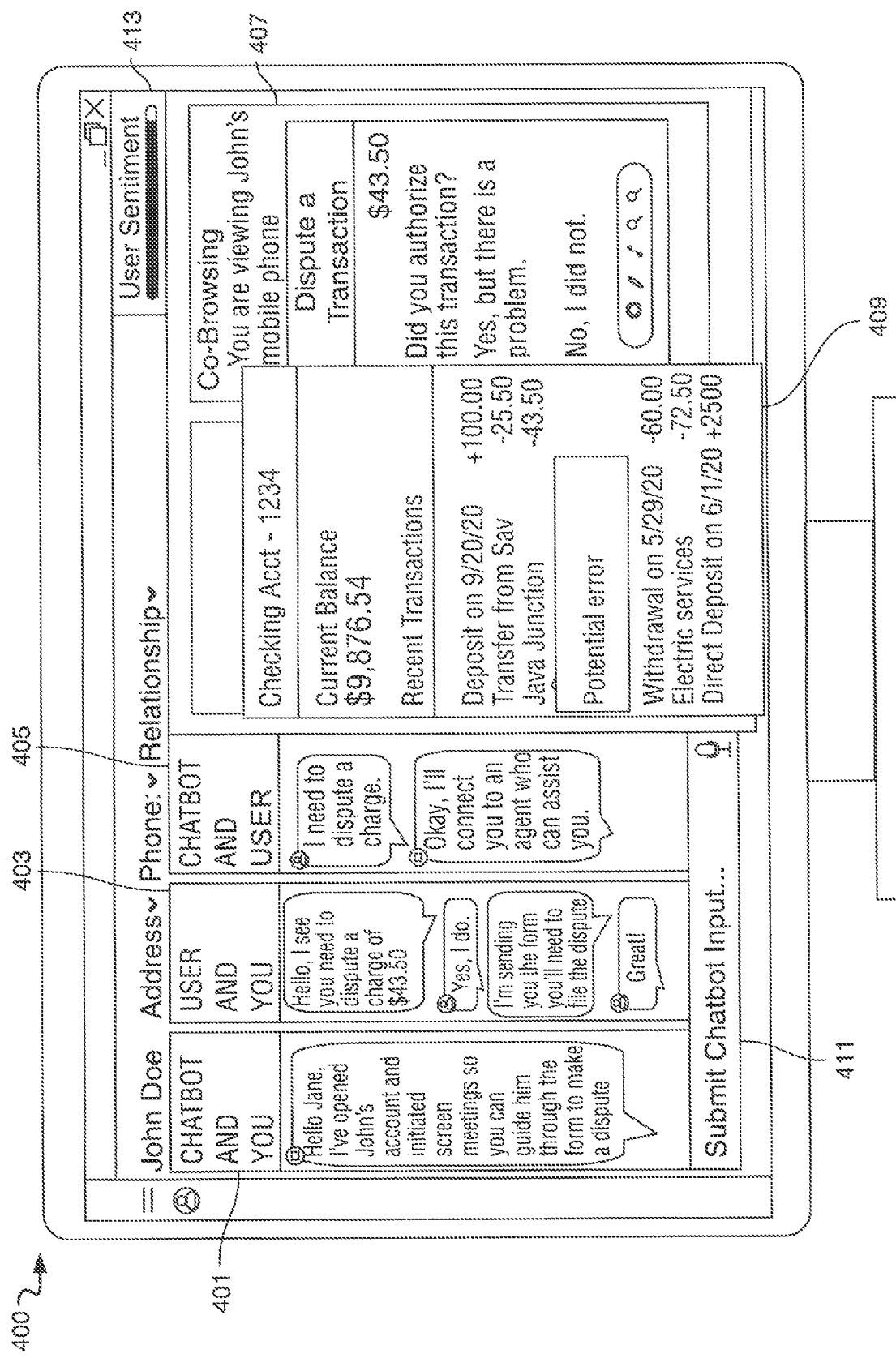
FIG. 4 shows an illustrative user interface in accordance with principles of the disclosure.

FIG. 4 shows illustrative agent interface 400. Agent interface 400 includes interface window 401. Interface window 401 shows illustrative agent-chatbot interaction 303. Agent interface 400 shows user-chatbot interaction 305 in interface window 405. Interface window 401 shows that AI engine 101 has generated autonomous responses based on user-chatbot interaction 305. Agent interface 400 also shows screen mirror 407. Screen mirror 407 displays, within agent interface 400, what is being displayed on user-chatbot interface 109 (shown in FIG. 1).

Agent interface 400 shows agent-user interaction 301 in interface window 403. Agent interface 400 has located, displayed and annotated transaction history 409. Agent interface 400 has flagged a $43.50 transaction as being potentially erroneous. Agent interface 400 shows interface window 411 for submitting agent input 107 to AI engine 101. Agent interface 400 shows sentiment score 413 for the displayed interaction. Sentiment score 413 may be determined based on content presented within interface windows 401, 403, 405 and 407. Sentiment score 413 may be computed by sentiment score module 209 (shown above in FIG. 2).

Figure 5:
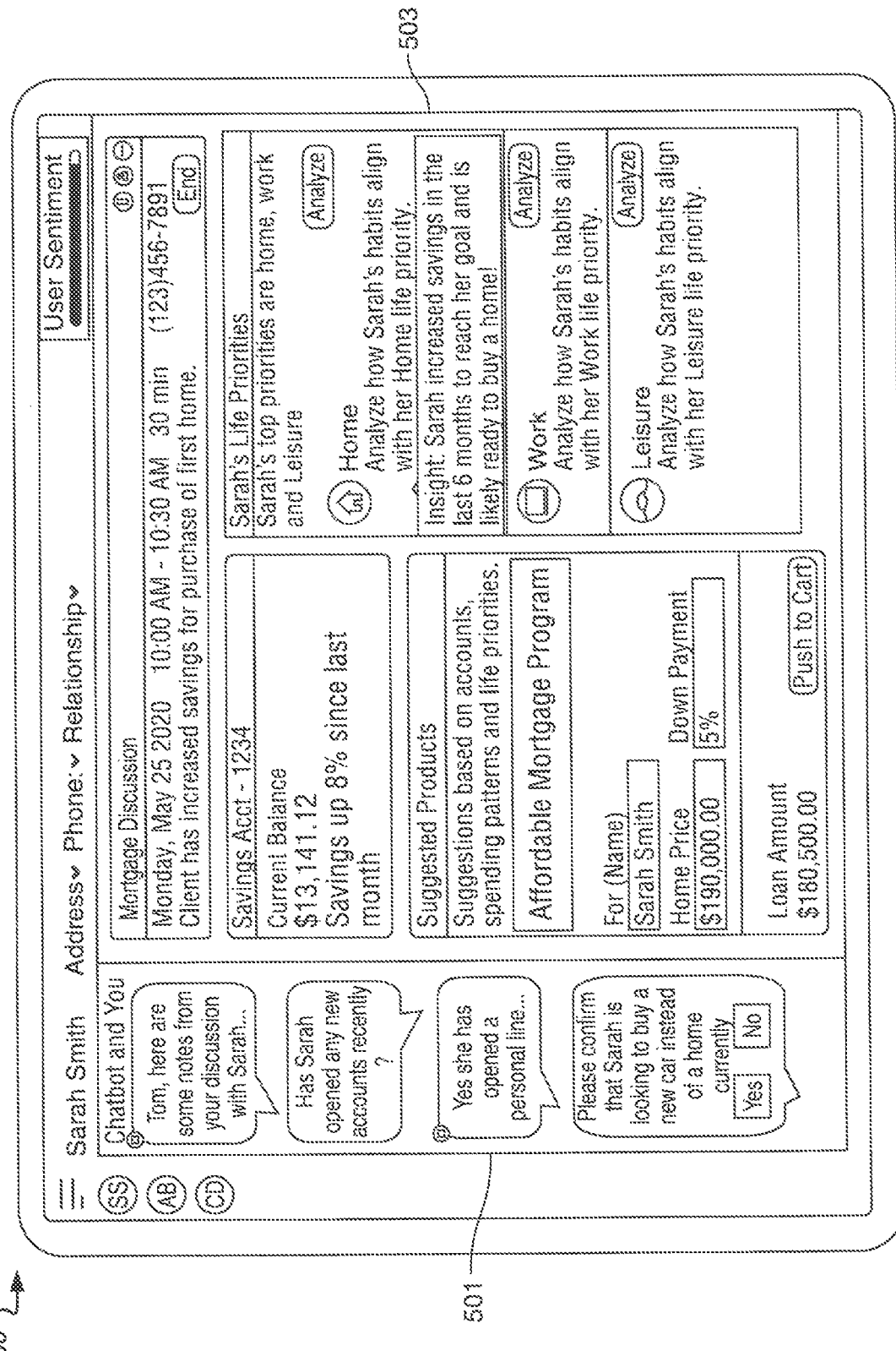
FIG. 5 shows an illustrative user interface in accordance with principles of the disclosure.

FIG. 5 shows illustrative agent interface 500. Agent interface 500 includes interface window 501. Interface window 501 shows content associated with an illustrative agent-chatbot interaction 303. Agent interface 500 shows interface window 503 which presents information that is determined by AI engine 101 to be relevant to the subject matter of agent-chatbot interaction 303 presented in interface window 501. The relevant information includes products that the user is eligible for (e.g., mortgage) and analysis of transaction activity (e.g., 8% increase in savings). AI engine 101 may locate relevant information using one or more modules shown in FIG. 2.

Agent interface 500 also shows that interface window 503 provides options for the agent to obtain additional information relevant to the agent-chatbot interaction 303, user-agent interaction 301 or user-chatbot interaction 305. For example, interface window 503 provides options for the agent to analyze how the user's habits align with other priorities of the user.

Figure 6:
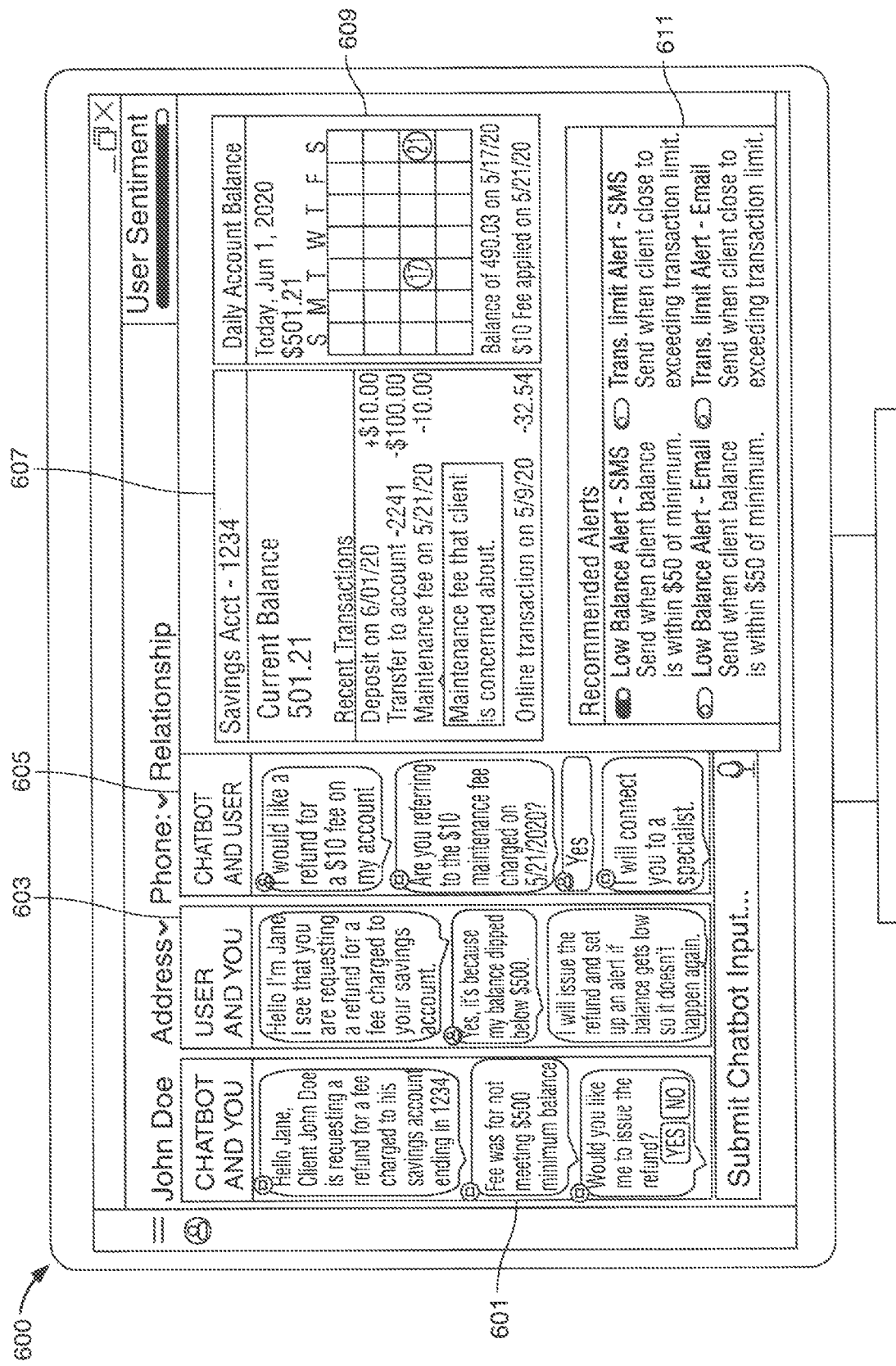
FIG. 6 shows an illustrative user interface in accordance with principles of the disclosure.

FIG. 6 shows illustrative agent interface 600. Agent interface 600 includes interface window 601. Interface window 601 shows illustrative content associated with agent-chatbot interaction 303. Interface window 601 shows that AI engine 101 has generated autonomous responses based on user-chatbot interaction 305. Agent interface 600 shows content associated with user-chatbot interaction 305 in interface window 605. Agent interface 600 shows content associated with agent-user interaction 301 in interface window 603.

FIG. 6 shows that agent interface 600 has located, displayed and annotated transaction history 607. Agent interface 600 has flagged a $10.00 maintenance fee within transaction history 607 as being associated with the user's concern. Agent interface 600 has also generated chart 609 showing graphically the user's transactions and associated account balances. The agent may share chart 609 with the user.

Agent interface 600 also shows, in interface window 611, recommended alerts that may be set to reduce likelihood of the user being charged the $10.00 maintenance fee. Display of the recommended alerts allows the agent to not only solve the user's current concern, but also take action to avoid a recurrence of the user's concern.

Thus, methods and apparatus for CHATBOT CO-PILOT are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") system for reducing time a first human agent spends interacting with a human user, the AI system comprising:
   an automated chatbot comprising first machine executable instructions stored on a non-transitory memory of a computer system, the first machine executable instructions when executed by a processor on the computer system:
      captures first input generated by the human user;
      generates a first automated response based on the first input;
      captures second input generated by the first human agent; and generates a second automated response based on the second input; and an agent interface that provides software tools for the first human agent to concurrently interact directly with the human user and directly with the automated chatbot, the agent interface comprising second machine executable instructions stored on the non-transitory memory of the computer system, the second machine executable instructions when executed by the processor on the computer system generates:
  a first interface window:
    presenting the first automated response; and
    allowing the first human agent to override the first automated response;
  a second interface window for the first human agent to interact directly with the human user;
  a third interface window:
    presenting the second automated response;
    allowing the first human agent to move the second automated response into the second interface window; and
    allowing the first human agent to submit third input to the automated chatbot; and
  a fourth interface window:
    presenting a crowdsourced response received from a second human agent; and
    allowing the first human agent to move the crowdsourced response into the second interface window;
  wherein, the second machine executable instructions when executed by the processor on the computer system:
    presents the first, second, third and fourth interface windows concurrently within the agent interface; and
    based on the second automated response, determines a location for each of the first, second, third and fourth interface windows within the agent interface.

2. The AI system of claim 1 wherein, the first machine executable instructions, when executed by the processor on the computer system utilize machine learning algorithms to generate the second automated response.

3. The AI system of claim 1 wherein the second machine executable instructions when executed by the processor on the computer system:
  based on the first input, locate at least one transaction associated with the human user;
  include the at least one transaction in the second automated response; and
  present the at least one transaction to the first human agent in the third interface window.

4. The AI system of claim 1 wherein the second machine executable instructions when executed by the processor on the computer system apply a machine learning algorithm to the first input and the first automated response to generate the second automated response.

5. The AI system of claim 1 wherein the second machine executable instructions when executed by the processor on the computer system apply a machine learning algorithm to the first input and the second input to generate the second automated response.

6. The AI system of claim 1 wherein:
  the first input is submitted by the human user during a time period when the human user directly interacts with the automated chatbot; and
  the human user does not interact directly with the first human agent during the time period.

7. The AI system of claim 6 wherein, the time period is a first time period, and the second input is submitted by the first human agent when interacting directly with the human user during a second time period.

8. The AI system of claim 1 wherein, the second machine executable instructions when executed by the processor on the computer system displays the fourth interface window to the first human agent after receiving the crowdsourced response from the second human agent.

9. The AI system of claim 1 wherein, the second machine executable instructions when executed by the processor on the computer system allow the first human agent to override the first automated response before the first automated response is presented to the human user.

10. An Artificial Intelligence ("AI") system for reducing remote interaction time of a first human agent and a human user, the AI system comprising:
  an automated chatbot that:
    receives first input from the human user;
    receives second input from the first human agent;
    autonomously generates first output responsive to the first input; and
    autonomously generates second output responsive to the second input;
  a user interface that provides access to software tools for the human user to:
    submit the first input; and
    interact with the automated chatbot or the first human agent;
  an agent interface that provides software tools for the first human agent to:
    interact directly with the human user; and
    interact directly with the automated chatbot;
  wherein, the agent interface comprises machine executable instructions that when executed by a processor on a computer system presents:
    a first interface window showing:
      first interaction of the human user and the automated chatbot; and
      the first output responsive to the first input;
    a second interface window showing:
      second interaction of the first human agent with the human user; and
      the second output responsive to the second input;
    a third interface window for the first human agent to interact directly with the human user; and
    a fourth interface window showing crowdsourced responses based on the first input or the second input and received from one or more second human agents;
  wherein the automated chatbot dynamically configures the agent interface to prevent the first human agent from overriding the first output when the crowdsourced response corresponds to the first output.

11. The AI system of claim 10, wherein the automated chatbot dynamically configures the agent interface to request the crowdsourced responses from the one or more second human agents based on a real-time workflow associated with each of the second human agents.

12. The AI system of claim 10, wherein the automated chatbot dynamically configures the agent interface to present a fifth interface window to the one or more second human agents, wherein the fifth interface window mirrors the third interaction of the first human agent and the automated chatbot.

13. The AI system of claim 10, wherein the automated chatbot dynamically configures the agent interface to present a fifth interface window to the first human agent that mirrors a screen presented on a mobile device of the human user.

14. The AI system of claim 10, wherein the automated chatbot interjects the second output into the user interface while the first human agent is interacting directly with the human user.

15. The AI system of claim 10, wherein the automated chatbot interjects the crowdsourced responses into the user interface while the first human agent is interacting directly with the human user.

16. An artificial intelligence ("AI") method for reducing time a human agent spends interacting with a human user, the AI method comprising:
- using a client application running on a mobile device, initiating a first interaction between the human user and an automated chatbot;
- connecting the client application to a first agent application;
- using the first agent application, in parallel initiating:
  - a second interaction between the human agent and the human user;
  - a third interaction that crowdsources input provided to the first interaction and the second interaction among one or more second agent applications; and
  - a fourth interaction between the human agent and the automated chatbot; and
- applying one or more machine learning algorithms to the first interaction, the second interaction and the third interaction to generate automated responses for the fourth interaction;
- wherein the method further comprises dynamically preventing the first agent application from overriding the fourth interaction when the one or more second agent applications' input correspond to the fourth interaction.

17. The AI method of claim 16 further comprising:
- receiving a threshold number of crowdsourced inputs from the one or more second agent applications; and
- interjecting at least one of the crowdsourced inputs into the fourth interaction.

18. The AI method of claim 17 further comprising using the first agent application, pushing the automated responses generated for the third interaction to the mobile device.

* * * * *